United States Patent [19]
Shinbori

[11] Patent Number: 5,404,090
[45] Date of Patent: Apr. 4, 1995

[54] ELECTRIC POWER SUPPLY DEVICE
[75] Inventor: Kenichi Shinbori, Kanagawa, Japan
[73] Assignee: Canon Kabushiki Kaisha, Tokyo, Japan
[21] Appl. No.: 973,305
[22] Filed: Nov. 9, 1992
[30] Foreign Application Priority Data Nov. 21, 1991 [JP] Japan .................................. 3-306240

[51] Int. Cl.6 ................................................. H02J 7/00
[52] U.S. Cl. ........................................ 320/2; 429/97; 429/99
[58] Field of Search ..................... 340/636; 429/97, 99; 320/2

[56] References Cited
U.S. PATENT DOCUMENTS 5,182,546 1/1993 Shinbori et al. ..................... 340/636

Primary Examiner—José G. Dees
Assistant Examiner—Samuel Barts
Attorney, Agent, or Firm—Robin, Blecker, Daley & Driscoll

[57] ABSTRACT

In an electric power supply device for supplying electric power to an electronic apparatus, while a first power source is in a state of being connectable to a first power supply path which is arranged to supply electric power directly to the electronic apparatus when the first power supply path is connected to the first power source, a second power source becomes unconnectable to a second power supply source which is arranged to supply electric power directly to the electronic apparatus when the second power supply path is connected to the second power source. While the second power source is in a state of being connectable to the second power supply path, the first power source becomes unconnectable to the first power supply path. With its simple and low-cost arrangement, the device not only effectively prevents duplex power feeding from different kinds of power sources and a voltage drop but also excels in operability and safety.

8 Claims, 15 Drawing Sheets

TO EACH ELECTRIC CIRCUIT

ELECTRIC POWER SUPPLY DEVICE

BACKGROUND OF THE INVENTION

1. Field of the Invention

This invention relates to an electric power supply device for feeding electric power from a plurality of power sources of different kinds such as a power line and dry cells or secondary batteries, to an electronic apparatus.

2. Description of the Related Art

The electric power supply devices of the kind capable of selectively feeding electric power from any of a plurality of power sources of different kinds such as a power line and dry cells or secondary batteries to an electronic apparatus which is operated by the supply of electric power have been arranged as shown in FIGS. 1 and 2.

FIG. 1 is an oblique view showing the conventional electric power supply device. FIG. 2 shows a circuit equivalent to the device shown in FIG. 1.

Referring to FIGS. 1 and 2, a battery pack 41 is arranged to contain dry cells or secondary batteries as a power source. A power supply plug 42 is arranged to supply DC power from an AC/DC (AC-to-DC) converter or the like. A power supply jack 43 includes a change-over switch 43b which is arranged to prevent duplex power feeding by giving priority to the selection of the power supplied through the power supply plug 42 when the power supply plug 42 is inserted into the power supply jack 43. Battery pack contacting contacts 44 are disposed within the body of an electronic apparatus and arranged to come into contact with the contacts of the battery pack 41. A voltage transforming circuit unit 45 is arranged to perform a voltage transforming action on the supplied electric power into a power suited for each of applicable electric circuits and to distribute and feed the voltage-transformed power to each electric circuit. Reference numerals 46a to 46d respectively denote power transmitting lead wires.

In the arrangement shown in FIGS. 1 and 2, the power outputted from the battery pack 41 (i.e., an input current) comes from the battery pack contacting contacts 44 and, after that, is supplied to the voltage transforming circuit unit 45 through the lead wire 46a, the change-over switch 43b disposed within the power supply jack 43 and the lead wire 46c. A return current flows into the battery pack 41 through the lead wire 46b and the battery pack contacting contacts 44.

In a case where DC power is to be supplied to the electronic apparatus from an AC/DC converter or the like (not shown) via the power supply plug 42, the position of the change-over switch 43b within the power supply jack 43 is changed by inserting the power supply plug 42 into the power supply jack 43. The power supplied via the power supply plug 42 and the power supply jack 43 is then supplied to the voltage transforming circuit unit 45 via the lead wire 46c. A return current then flows via the lead wire 46d to a power supply plug contacting terminal 43a disposed within the power supply jack 43.

FIGS. 3 and 4 show another arrangement example of the conventional electric power supply device. FIG. 3 is an oblique view of the device while FIG. 4 shows a circuit equivalent to the device shown in FIG. 3. In the arrangement shown in FIGS. 3 and 4, all component parts arranged in the same manner as those of FIGS. 1 and 2 are indicated by the same reference numerals and the details of them are omitted from the following description.

Referring to FIGS. 3 and 4, lead wires 46e and 46f are provided for power transmission between the battery pack contacting contacts 44 and the voltage transforming circuit unit 45. A dummy battery pack 47 is arranged in about the same shape as the battery pack 41 and to has power supply jack 43 and contacts 47a.

With the conventional electric power supply device arranged as shown in FIGS. 3 and 4, the provision of the dummy battery pack 47 enables the power supplied from the power supply plug 42 to be supplied via the power supply jack 43 and the contacts 47a to the battery pack contacting contacts 44 disposed within the electronic apparatus in the same manner as the battery pack 41 which is shown in FIGS. 1 and 2.

The conventional electric power supply device shown in FIGS. 1 and 2 is capable of preventing the so-called duplex power feeding, i.e., simultaneous supply of power from different kinds of power sources. However, since the power supplied from the battery pack contacting contacts 44 is supplied via the power supply jack 43, the power transmission path includes the lead wire 46a, the change-over switch 43b and the lead wire 46c, and the adverse effect of the impedance resulting from the lengths of these lead wires, the contact resistance of the change-over switch 43b, etc., causes an extremely high impedance of the power supply path from the battery pack contacting contacts 44 to the voltage transforming circuit unit 45.

Therefore, in a case where the current level of the power supplied from the battery pack 41 is high, a voltage drop would occur. Under such a condition, the electronic apparatus tends to be shut down before the power of the battery pack 41 is sufficiently used up.

In the case of the conventional electric power supply device shown in FIGS. 3 and 4, the impedance of the power supply path from the battery pack contacting contacts 44 to the voltage transforming circuit unit 45 can be lowered. However, this electric power supply device necessitates the use of the dummy battery pack 47, which increases the size of arrangement of the apparatus and thus results in an increase in cost. Further, in a case where power is to be supplied from the AC/DC converter or the like through the power supply plug 42, if the battery pack 41 has already been loaded into the electric power supply device, the battery pack 41 must be replaced with the dummy battery pack 47. Such a replacing operation undesirably degrades operability.

SUMMARY OF THE INVENTION

It is a general object of this invention to provide an electric power supply device capable of solving the above-stated problems of the prior art.

It is a more specific object of this invention to provide an electric power supply device capable of preventing occurrence of a voltage drop in a power source with a simple and low-cost arrangement.

Under this object, an electric power supply device which is arranged as an embodiment of the invention to supply electric power to an electronic apparatus comprises a first power supply path arranged to supply electric power directly to the electronic apparatus when the first power supply path is connected to a first power source; a second power supply path arranged to supply electric power directly to the electronic apparatus when the second power supply path is connected to a second power source; and connection state control means arranged to render the second power source unconnectable to the second power supply path when the first power source is in a state of being connectable to the first power supply path and to render the first power source unconnectable to the first power supply path when the second power source is in a state of being connectable to the second power supply path.

It is another specific object of the invention to provide an electric power supply device which is arranged to be capable of preventing duplex power feeding from a plurality of power sources of different kinds.

Under that object, an electric power supply device arranged as an embodiment of the invention to supply electric power to an electronic apparatus comprises a first connection terminal arranged to be connected to a first power source for supplying electric power from the first power source; a second connection terminal arranged to be connected to a second power source for supplying electric power from the second power source; and a shield member arranged to shield the second connection terminal in such a way as to prevent the second power source from being connected to the second connection terminal when the first power source is in a state of being connectable to the first connection terminal and to shield the first connection terminal in such a way as to prevent the first power source from being connected to the first connection terminal when the second power source is in a state of being connectable to the second connection terminal.

It is a further specific object of the invention to provide an electric power supply device which excels in operability and safety.

Under the above-stated object, an electric power supply device arranged as an embodiment of this invention to supply electric power to an electronic apparatus comprises a battery pack containing a battery therein; and a connection terminal for receiving electric power from a power line, the connection terminal being arranged in a position to be shielded by part of a casing of the battery pack when the battery pack is mounted on the device and to be exposed when the battery pack is demounted from the device.

These and other objects and features of this invention will become apparent from the following detailed description of embodiments thereof taken in connection with the accompanying drawings.

DETAILED DESCRIPTION OF THE PREFERRED EMBODIMENTS

Figure 1:
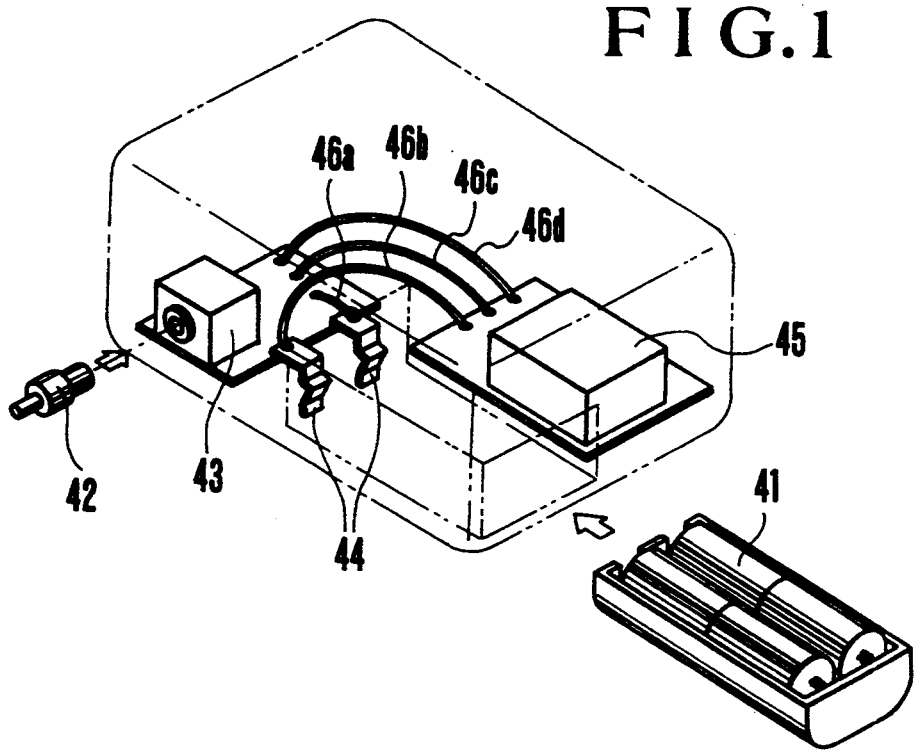
FIG. 1 is an oblique view showing the conventional electric power supply device.
Figure 2:
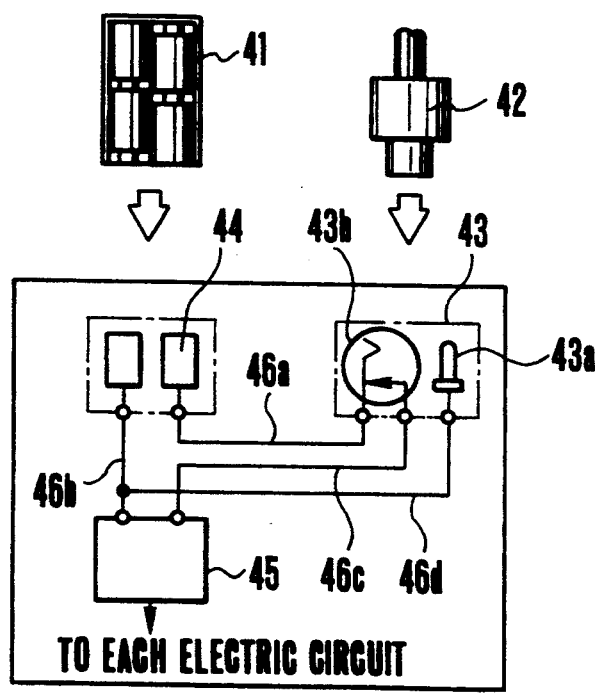
FIG. 2 shows a circuit equivalent to the electric power supply device shown in FIG. 1.
Figure 3:
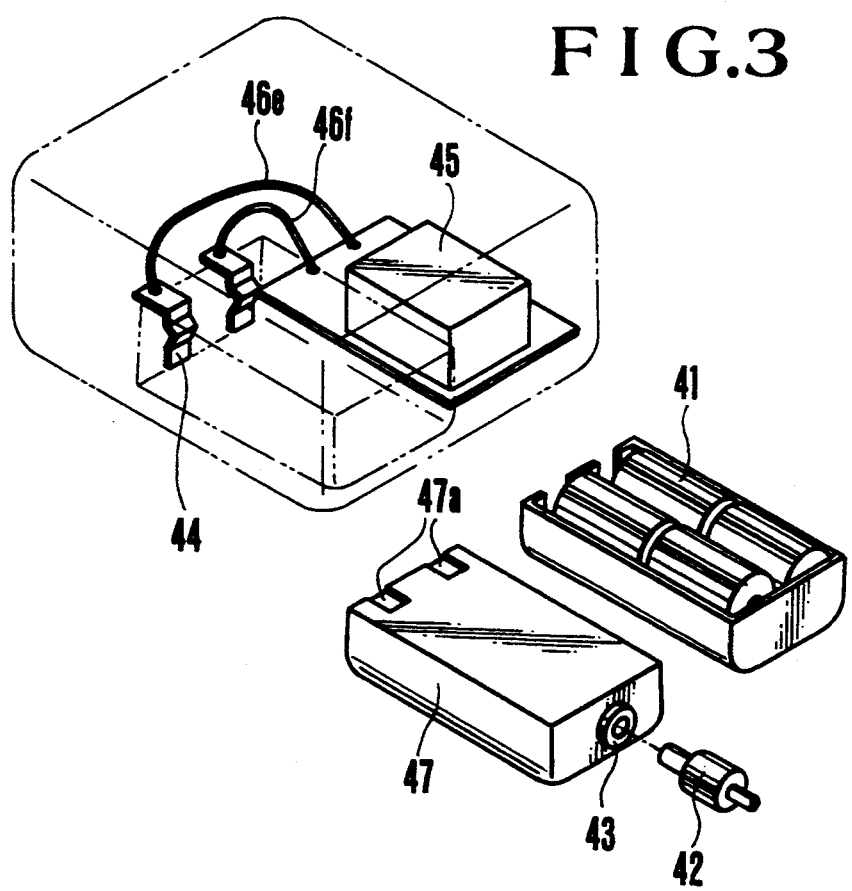
FIG. 3 is an oblique view showing another conventional electric power supply device.
Figure 4:
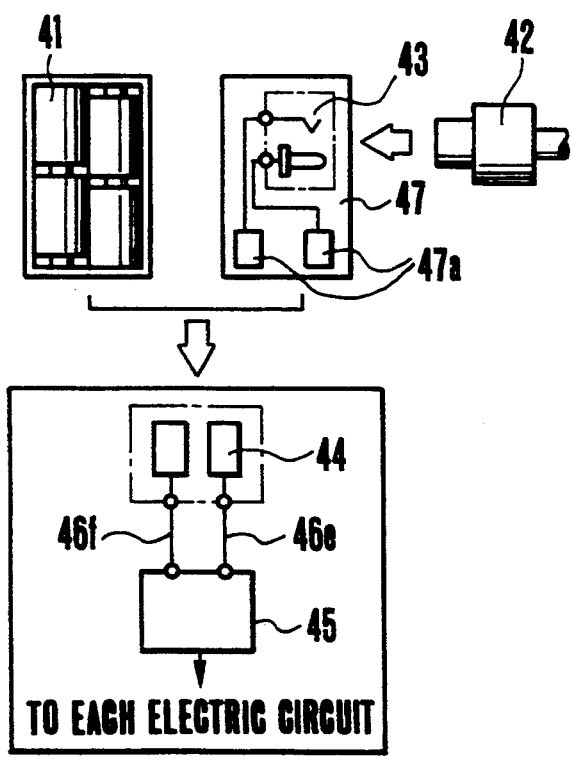
FIG. 4 shows a circuit equivalent to the electric power supply device shown in FIG. 3.
Figure 5:
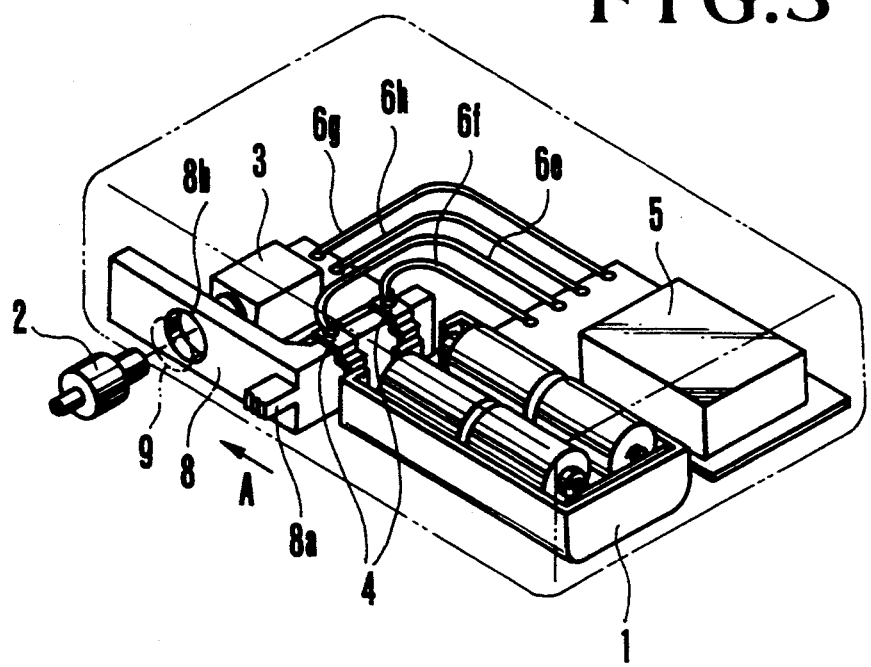
FIG. 5 is an oblique view showing an electric power supply device arranged as a first embodiment of this invention, in a state of supplying power from an AC/DC converter, etc., through a power supply plug.
Figure 6:
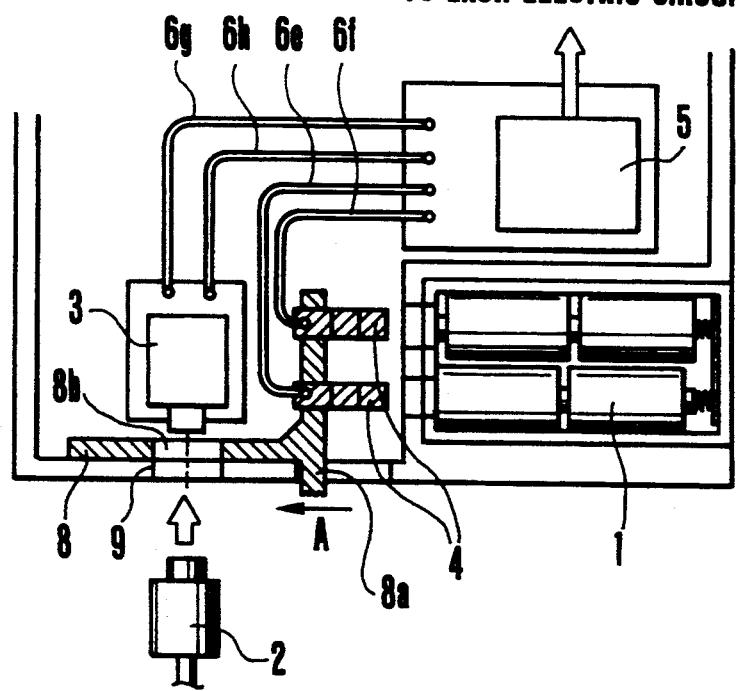
FIG. 6 is a see-through top view of the electric power supply device shown in FIG. 5.
Figure 7:
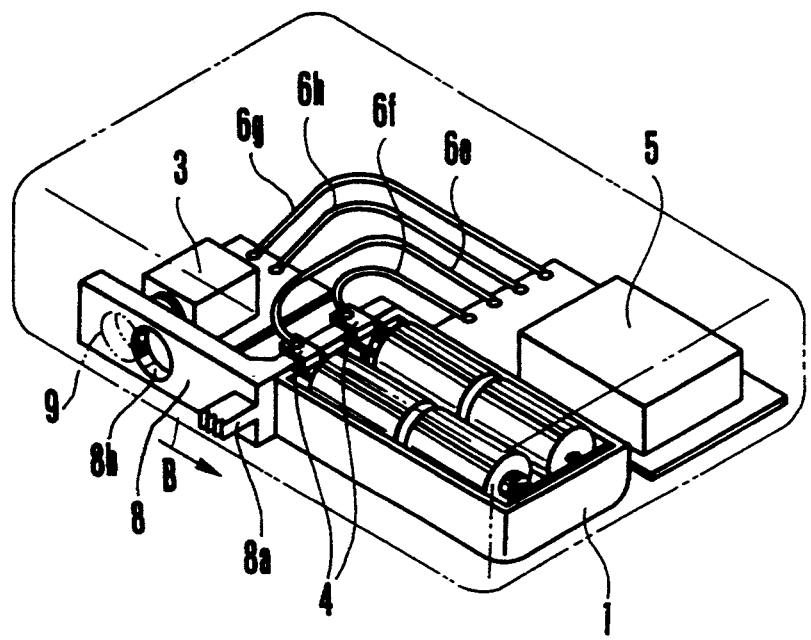
FIG. 7 is an oblique view showing the electric power supply device which is the first embodiment in a state of supplying power from a battery pack.
Figure 8:
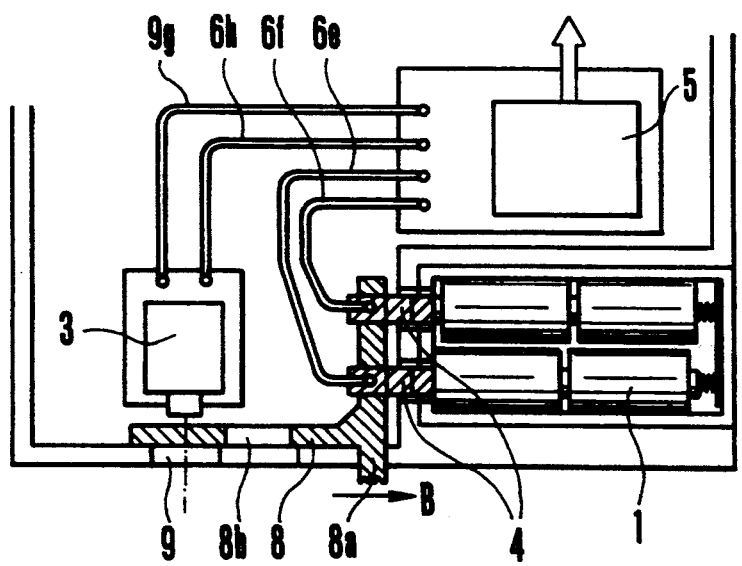
FIG. 8 is a see-through top view of the electric power supply device shown in FIG. 7.
Figure 9:
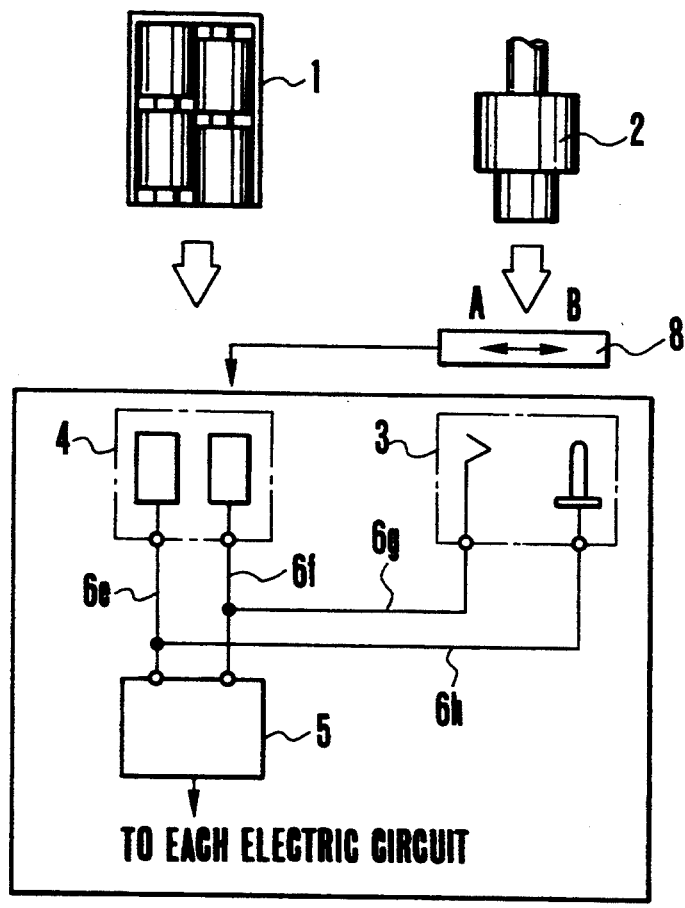
FIG. 9 shows a circuit equivalent to the electric power supply device shown in FIGS. 5 to 8.

The following describes this invention through embodiments thereof:

FIGS. 5 to 9 show the arrangement of an electric power supply device according to this invention as a first embodiment thereof. Of these figures, FIG. 5 is an oblique view showing the electric power supply device in a state of supplying power from an AC/DC converter, etc., through a power supply plug. FIG. 6 is a see-through top view of the electric power supply device shown in FIG. 5. FIG. 7 is an oblique view showing the electric power supply device in a state of supplying power from a battery pack. FIG. 8 is a see-through top view of the device in the state shown in FIG. 7. FIG. 9 shows a circuit equivalent to the device shown in FIGS. 5 to 8.

Referring to FIGS. 5 to 9, a battery pack 1 is arranged to contain therein dry cells or secondary batteries as A power source. A power supply plug 2 is arranged to supply DC electric power from an AC/DC converter, etc. The device includes a power supply jack 3. Battery pack contacting contacts 4 are arranged to be in contact with the contacts of the battery pack 1. A voltage transforming circuit unit 5 is arranged to voltage-transform the supplied power into a power suited to each of applicable electric circuits and to distribute and supply the power to each of the electric circuits. Lead wires 6e to 6h are arranged for transmitting electric power. A lid member 8 consists of a slide knob part 8a on which the above-stated battery pack contacting contacts 4 are mounted and an aperture part 8b. A hole part 9 is formed on an exterior part of the electronic apparatus in a position where a hole into which the power supply plug 2 is to be inserted is formed in the power supply jack 3.

With the device arranged as shown in FIGS. 5 to 9, in bringing the device into the state of supplying electric power from the AC/DC converter, etc., through the power supply plug 2 as shown in FIGS. 5 and 6, the slide knob part 8a of the lid member 8 is slid in the direction of arrow A. Then, the aperture part 8b of the lid member 8 comes to coincide with the hole part 9 which is formed on the exterior part of the electronic apparatus in a position where the hole into which the power supply plug 2 is to be inserted is formed in the power supply jack 3, as shown in FIGS. 5 and 6, so that the power supply plug 2 can be inserted into the power supply jack 3. At the same time, the battery pack contacting contacts 4 are parted from the contacts of the battery pack 1 to cut off the supply of power from the battery pack 1, so that duplex power feeding can be prevented from occurring.

In bringing the electric power supply device into the state of supplying electric power from the battery pack 1 as shown in FIGS. 7 and 8, the battery pack contacting contacts 4 are brought into contact with the contacts of the battery pack 1 by sliding the slide knob part 8a of the lid member 8 in the direction of arrow B to permit the supply of power from the battery pack 1. In this state, the aperture part 8b of the lid member 8 is in a position deviating from the hole part 9 which is formed on the exterior part of the electronic apparatus in a position where the hole into which the power supply plug 2 is to be inserted is formed in the power supply jack 3. Therefore, the hole part 9 is shielded by a part of the lid member 8 to block the insertion of the power supply plug 2, so that duplex power feeding can be prevented from occurring.

In the case of the first embodiment, as shown in FIGS. 5 to 9, the power transmission path from the battery pack 1 to the voltage transforming circuit unit 5 is arranged to be very short including only the lead wires 6e and 6f disposed between the voltage transforming circuit unit 5 and the battery pack contacting contacts 4 and not including the contact part of any other element such as a power supply path change-over switch or the like. The impedance of the power supply path thus can be minimized to lower the possibility of occurrence of a voltage drop in the power supplied from the battery pack 1. Therefore, electric power of the battery pack 1 can be sufficiently used up without causing any shut-down of the electronic apparatus.

Figure 10:
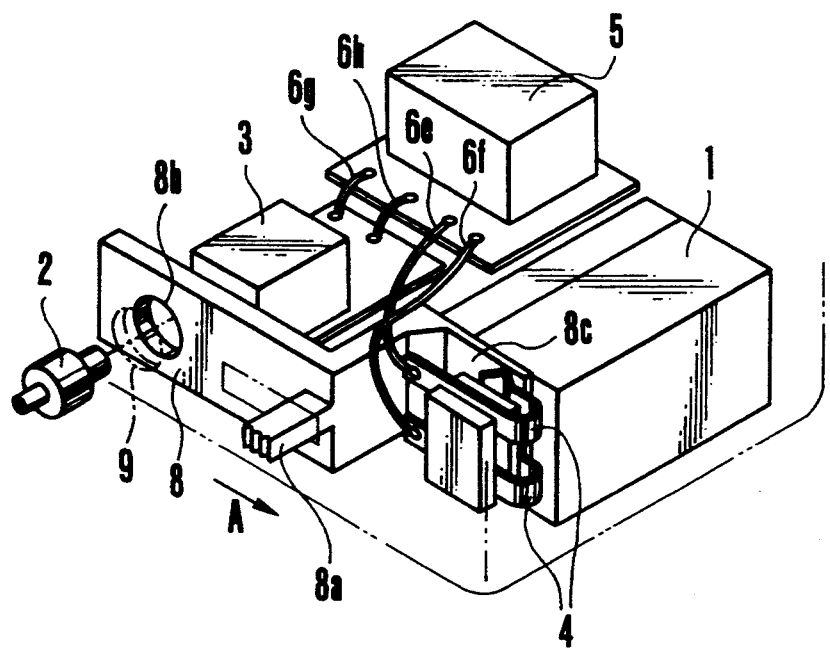
FIG. 10 is an oblique view showing an electric power supply device which is a second embodiment of this invention, in a state of supplying power from an AC/DC converter, etc., through a power supply plug.
Figure 11:
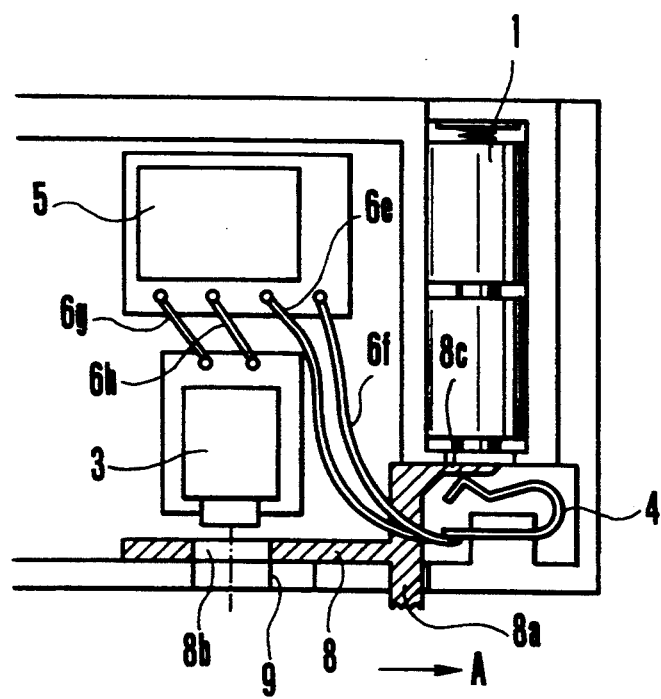
FIG. 11 is a see-through top view showing the electric power supply device shown in FIG. 10.
Figure 12:
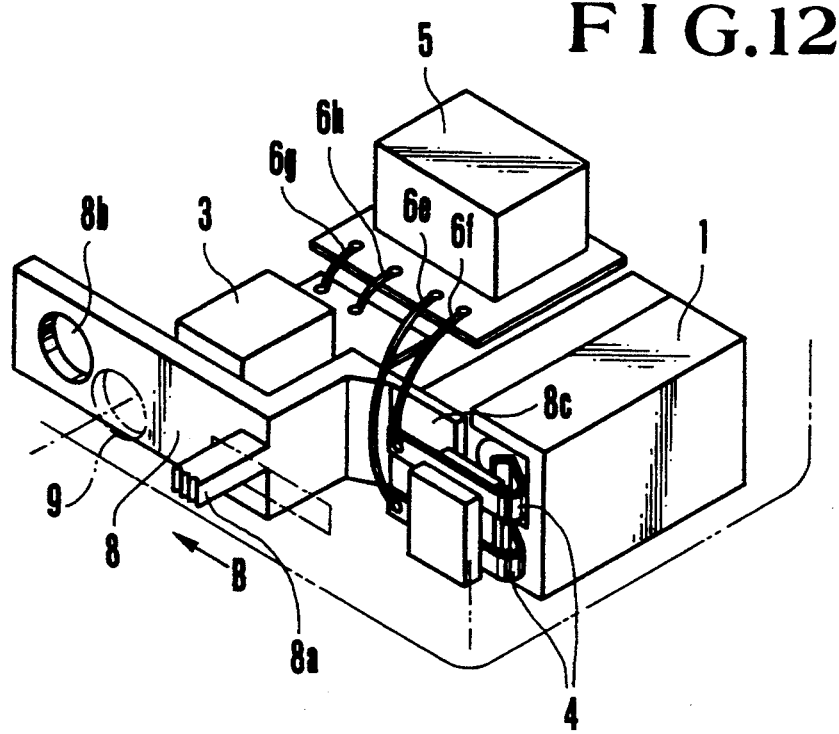
FIG. 12 is an oblique view showing the electric power supply device which is the second embodiment in a state of supplying power from a battery pack.
Figure 13:
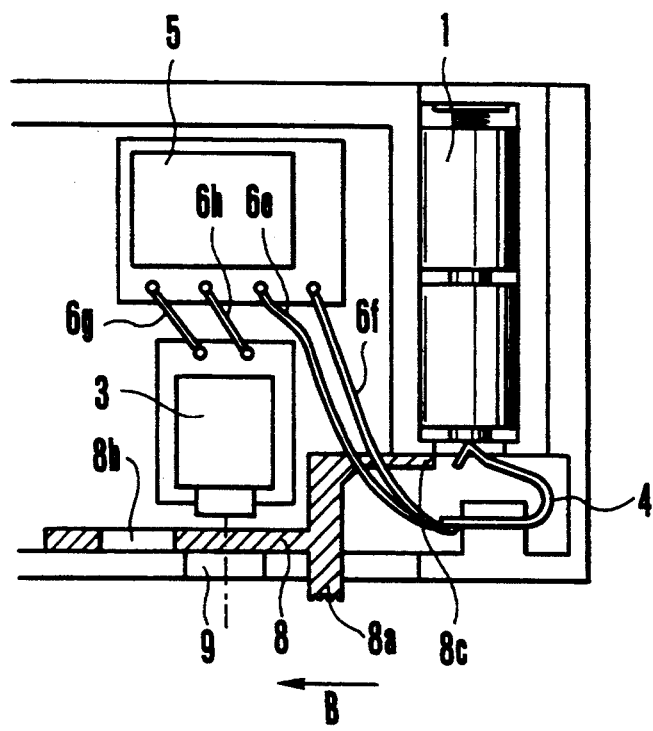
FIG. 13 is a see-through top view showing the electric power supply device shown in FIG. 12.

FIGS. 10 to 13 show the arrangement of another electric power supply device according to this invention as a second embodiment thereof. FIG. 10 is an oblique view showing the device in a state of supplying electric power from an AC/DC converter, etc., through a power supply plug. FIG. 11 is a see-through top view of the device shown in FIG. 10. FIG. 12 is an oblique view showing the same electric power supply device in a state of supplying electric power from a battery pack. FIG. 13 is a see-through top view showing the device in the state shown in FIG. 12. Further, in FIGS. 10 to 13, the parts arranged in the same manner as in those of the first embodiment are indicated by the same reference numerals and the details of them are omitted from description.

Referring to FIGS. 10 to 13, in the case of the second embodiment, the lid member 8 is further provided with a tongue part 8c which is made of an insulating material. The tongue part 8c is arranged to be insertable and retractable between the contacts of the battery pack 1 and the battery pack contacting contacts 4 by sliding the slide knob part 8a of the lid member 8.

Therefore, in bringing the device into a state of supplying electric power from the AC/DC converter, etc., via the power supply plug 2 as shown in FIGS. 10 and 11, the tongue part 8c of the lid member 8 is inserted in between the contacts of the battery pack 1 and the battery pack contacting contacts 4 by sliding the slide knob part 8a of the lid member 8 in the direction of arrow A as shown in these figures. In this state, the supply of power from the battery pack 1 is cut off, and the aperture part 8b of the lid member 8 comes to coincide with the hole part 9 which is formed on the exterior part of the electronic apparatus in a position where the hole into which the power supply plug 2 is to be inserted is formed in the power supply jack 3. Thus, the power supply plug 2 can be inserted into the power supply jack 3, so that duplex power feeding can be prevented by the arrangement described.

In bringing the device into a state of supplying electric power from the battery pack 1 as shown in FIGS. 12 and 13, the tongue part 8c is retracted by sliding the slide knob part 8a of the lid member 8 in the direction of arrow B. The contacts of the battery pack 1 are then brought into contact with the battery pack contacting contacts 4 to bring the device in the state of supplying electric power from the battery pack 1. In this state, the aperture part 8b of the lid member 8 is in a position deviating from the hole part 9 which is formed on the exterior part of the electronic apparatus in a position where the hole into which the power supply plug 2 is to be inserted is formed in the power supply jack. Therefore, the hole part 9 is shielded by part of the lid member 8 to hinder the insertion of the power supply plug 2, so that duplex power feeding can be prevented from occurring.

Further, in the second embodiment as shown in FIGS. 10 to 13, the power transmission path from the battery pack 1 to the voltage transforming circuit unit 5 is arranged, like in the case of the first embodiment, to include only the lead wires 6e and 6f which are interposed in between the battery pack contacting contacts 4 and the voltage transforming circuit unit 5, so that length of the power transmission path can be greatly shortened to lower the impedance of the power transmission path. The lower impedance of the power transmission path lowers the possibility of occurrence of a voltage drop in the power supplied from the battery pack 1, so that electric power of the battery pack 1 can be sufficiently used up without causing any shut-down of the electronic apparatus halfway in operation.

In each of the first and second embodiments described above, the lid member 8 is arranged to be slid by manually operating the slide knob part 8a. The lid member 8 may be arranged to be slid automatically in one direction back to its original position by the urging force of a spring or the like when the slide knob part 8a is released from the manually operating hand after it has been manually slid in the other direction.

As described above, despite the simple and low-cost arrangement, the first and second embodiments have the following advantage: duplex power feeding from different kinds of power sources is effectively prevented. In using, as a power source, a battery pack containing therein dry cells or secondary batteries, the lead wires from the battery pack are arranged to be short without including any change-over switch contact part or the like in such a way as to prevent any voltage drop that otherwise results from the wiring resistance and the contact resistance of a change-over switch, so that the battery pack can be effectively used without causing any shut-down of the electronic apparatus halfway in operation. In a case where electric power is to be supplied from the AC/DC converter through the power supply plug, the battery pack does not have to be demounted, even if it has already been mounted, so that the device can be simply operated. Further, any terminal part other than the terminal part used for the power source actually in use is arranged to be prevented from being inadvertently exposed, so that the terminal part can be protected from short-circuiting to enhance the safety of the device.

Figure 14:
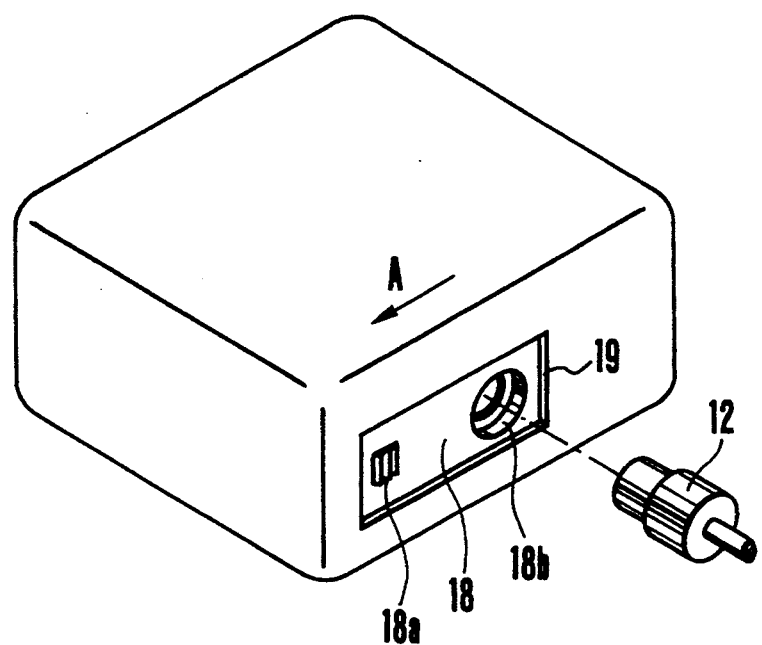
FIG. 14 is an oblique view showing an electric power supply device which is a third embodiment of this invention in a state of supplying power from an AC/DC converter, etc., through a power supply plug.
Figure 15:
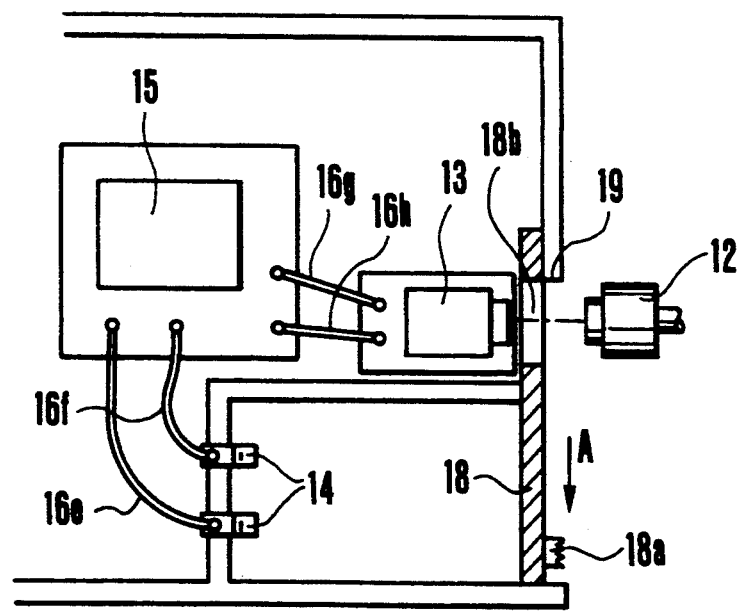
FIG. 15 is a see-through top view showing the electric power supply device shown in FIG. 14.
Figure 16:
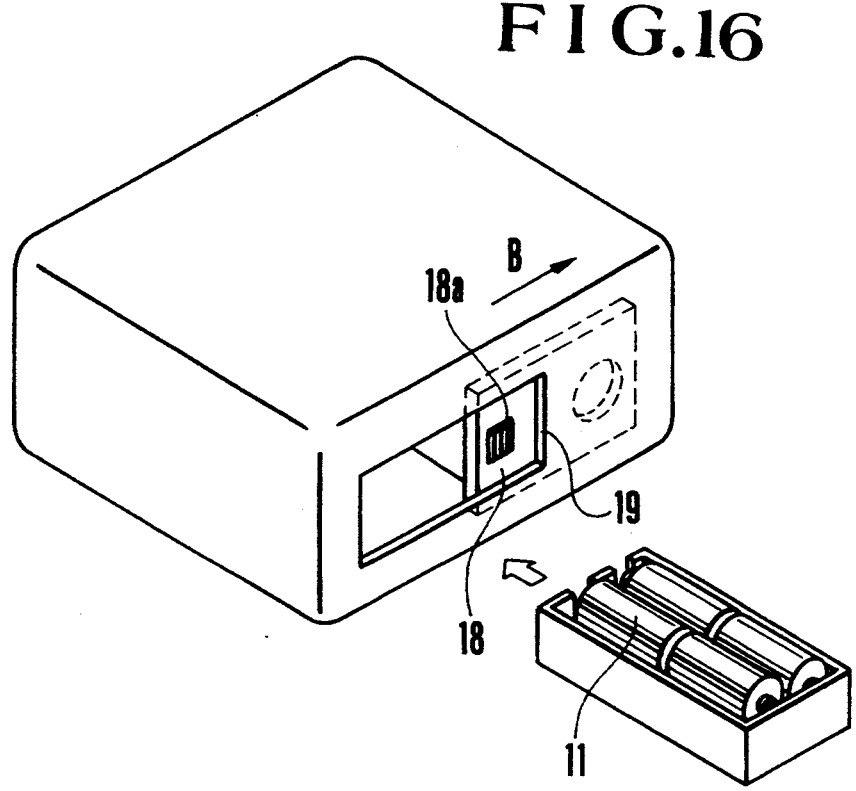
FIG. 16 is an oblique view showing the electric power supply device which is the third embodiment of this invention in a state of supplying power from a battery pack.
Figure 17:
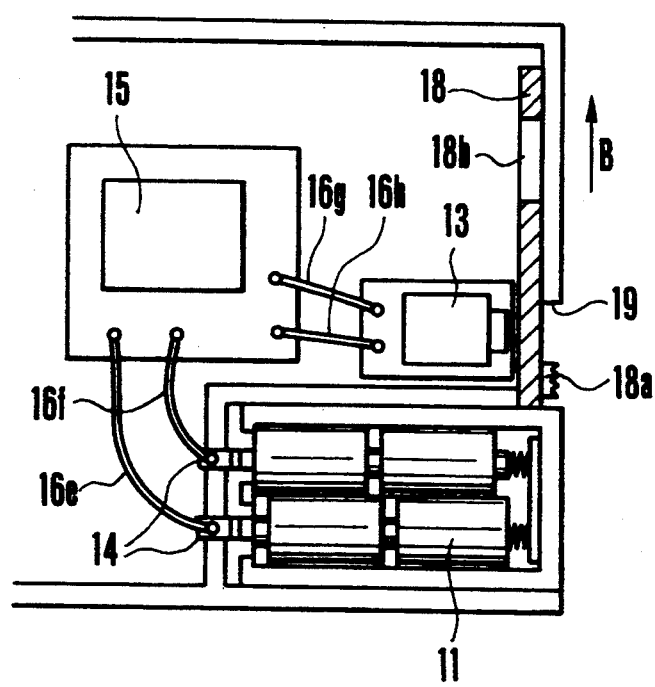
FIG. 17 is a see-through top view showing the electric power supply device shown in FIG. 16.
Figure 18:
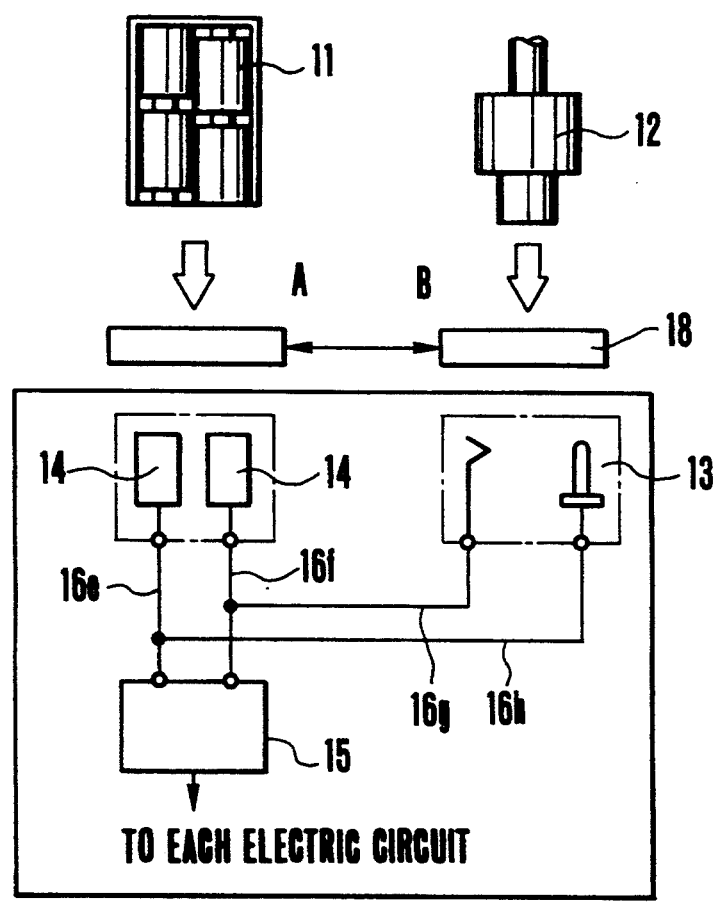
FIG. 18 shows a circuit equivalent to the electric power supply device shown in FIGS. 14 to 17.

FIGS. 14 to 18 show the arrangement of an electric power supply device according to this invention as a third embodiment thereof. Of these figures, FIG. 14 is an oblique view showing the electric power supply device in a state of supplying electric power from an AC/DC converter, etc., through a power supply plug. FIG. 15 is a see-through top view of the device shown in FIG. 14. FIG. 16 is an oblique view showing the electric power supply device in a state of supplying electric power from a battery pack. FIG. 17 is a see-through top view showing the same device as in the state shown in FIG. 16. FIG. 18 shows a circuit equivalent to the device shown in FIGS. 14 to 17.

Referring to FIGS. 14 to 18, a battery pack 11 contains therein dry cells or secondary batteries as a power source. A power supply plug 12 is arranged for supplying DC electric power from an AC/DC converter, etc. Reference numeral 13 denotes a power supply jack. Battery pack contacting contacts 14 are arranged to come into contacts with the contacts of the battery pack 11. A voltage transforming circuit unit 15 is arranged to voltage-transform the supplied power into an electric power suited to each of the applicable electric circuits. Lead wires 16e to 16h are arranged for electric power transmission. A lid member 18 consists of a slide knob part 18a and an aperture part 18b. A hole part 19 is formed on an exterior part of the electronic apparatus in a position where a hole into which the power supply plug 12 is to be inserted is formed in the power supply jack 13.

With the third embodiment arranged as shown in FIGS. 14 to 18, in bringing the electric power supply device into the state of supplying electric power from the AC/DC converter, etc., through the power supply plug 12 as shown in FIGS. 14 and 15, the slide knob part 18a of the lid member 18 is slid in the direction of arrow A. The aperture part 18b of the lid member 18 is thus caused to coincide with the hole part 19 which is formed on the exterior part of the electronic apparatus in a position where the hole into which the power supply plug 12 is to be inserted is formed in the power supply jack 13. The power supply plug 12 thus becomes insertable into the power supply jack 13. At the same time, an inserting hole provided in the exterior part of the electronic apparatus for mounting the battery pack 11 on the apparatus is covered by part of the lid member 18 to prevent the battery pack 11 from being mounted. Therefore, the device effectively precludes the possibility of duplex power feeding from the battery pack 11 while electric power is being supplied from the AC/DC converter through the power supply plug 12.

In bringing the electric power supply device into the state of supplying electric power from the battery pack 11 by mounting the battery pack 11, as shown in FIGS. 16 and 17, the slide knob part 18a of the lid member 18 is slid in the direction of arrow B. The inserting hole which is provided in the exterior part of the electronic apparatus for mounting the battery pack 11 on the apparatus and has been covered by part of the lid member 18 is opened by the sliding movement of the lid member 18 to make the battery pack 11 mountable. In this state, the position of the aperture part 18b of the lid member 18 deviates from that of the hole part 19 which is formed on the exterior part of the electronic apparatus in a position where the hole into which the power supply plug 12 is to be inserted is formed in the power supply jack 13. The hole part 19 is thus covered by part of the lid member 18 to hinder the power supply plug 12 from being inserted. Therefore, when electric power is supplied from the battery pack 11, duplex power feeding due to the supply of power from the AC/DC converter via the power supply plug 12 is prevented.

Further, in the third embodiment as shown in FIGS. 14 to 18, the electric power transmission path from the battery pack 11 to the voltage transforming circuit unit 15 is arranged to be very short including only the lead wires 16e and 16f which are disposed between the battery pack contacting contacts 14 and the voltage transforming circuit unit 15 and without including the contact part of any change-over switch or the like. The impedance of the power transmission path is thus lowered, so that the possibility of a voltage drop in the power supplied from the battery pack 11 can be lowered to enable the device to sufficiently use up electrical power of the battery pack 11 without causing any shut-down of the electronic apparatus halfway in operation.

Figure 19:
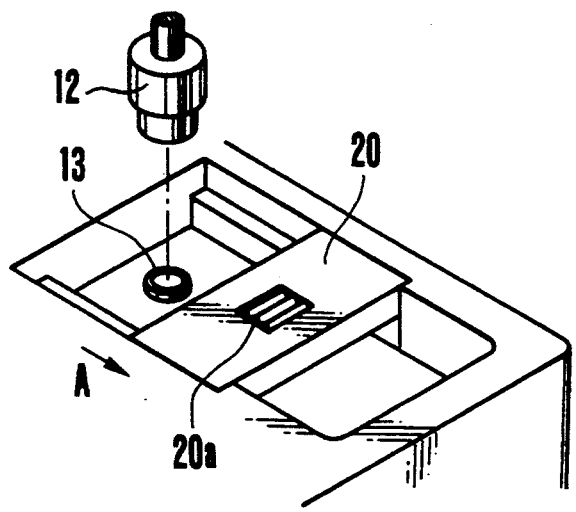
FIG. 19 is an oblique view showing an electric power supply device arranged according to this invention as a fourth embodiment thereof in the state where a power supply plug is insertable.
Figure 20:
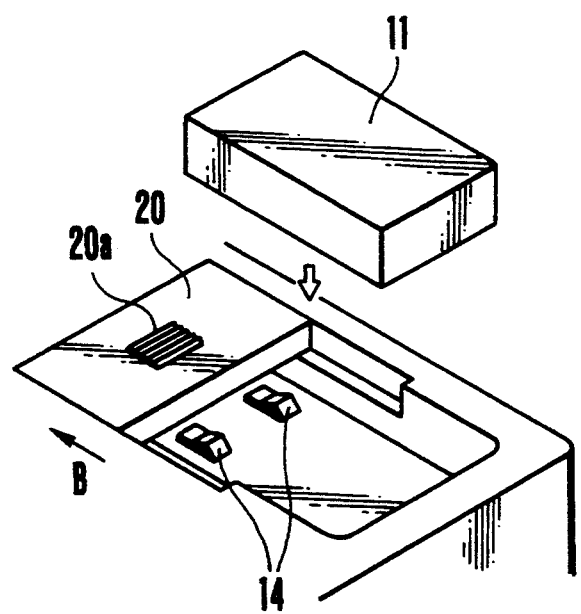
FIG. 20 is an oblique view showing the electric power supply device which is the fourth embodiment of this invention in the state where a battery pack is mountable.

FIGS. 19 and 20 show the arrangement of an electric power supply device according to this invention as a fourth embodiment thereof. FIG. 19 is an oblique view showing the electric power supply device in a state of allowing insertion of a power supply plug. FIG. 20 is an oblique view showing the same electric power supply device in a state of permitting a battery pack to be mounted thereon. In FIGS. 19 and 20, all parts that are arranged in the same manner in the case of the third embodiment shown in FIGS. 14 to 18 are indicated by the same reference numerals, and the details of them are omitted from description.

Unlike the lid member 18 in the third embodiment which is arranged to have the aperture part 18b as described in the foregoing, a lid member 20 in the fourth embodiment is of a simple sliding door type, as shown in FIGS. 19 and 20. The lid member 20 is arranged to have either the power supply jack 13 or the battery pack contacting contacts 14 selectively exposed by operating its slide knob part 20a to slide it in the direction of arrow A or B. Further, the same advantageous effect as that of the third embodiment is attainable with the lid member 20 arranged not to completely cover an inserting hole which is provided on the exterior part of the electronic apparatus for mounting the battery pack 11.

In each of the third and fourth embodiments described above, the lid member 18 or 20 is arranged to be manually slidable by operating the slide knob 18a or 20a. This arrangement, however, may be changed to have the lid member 18 or 20 arranged to be automatically slidable in one direction back to its original position by the urging force of a spring or the like when the slide knob 18a or 20a is released from the hand after the lid member 18 or 20 is manually slid in the other direction.

The third and fourth embodiments are arranged, as described above, to have the following advantage in spite of the very simple and low-cost structural arrangement: duplex power feeding from different kinds of power sources can be prevented. In using as a power source the battery pack containing therein dry cells or secondary batteries, the possibility of a voltage drop in the power supplied from the power source, resulting from the wiring resistance of the lead wires and the contact resistance of a change-over switch, is eliminated with the lead wires arranged to be short as a power supply path from the battery pack without including the contact part of any change-over switch or the like. The invented arrangement enables the device to effectively use the battery pack without causing any shut-down of the electronic apparatus halfway in operation. Further, the terminal part to be used for the power source other than the terminal part being used for the power source currently used is arranged to be prevented from being inadvertently exposed. That arrangement effectively protects the terminal part from short-circuiting, so that the safety of the device can be enhanced.

Figure 21:
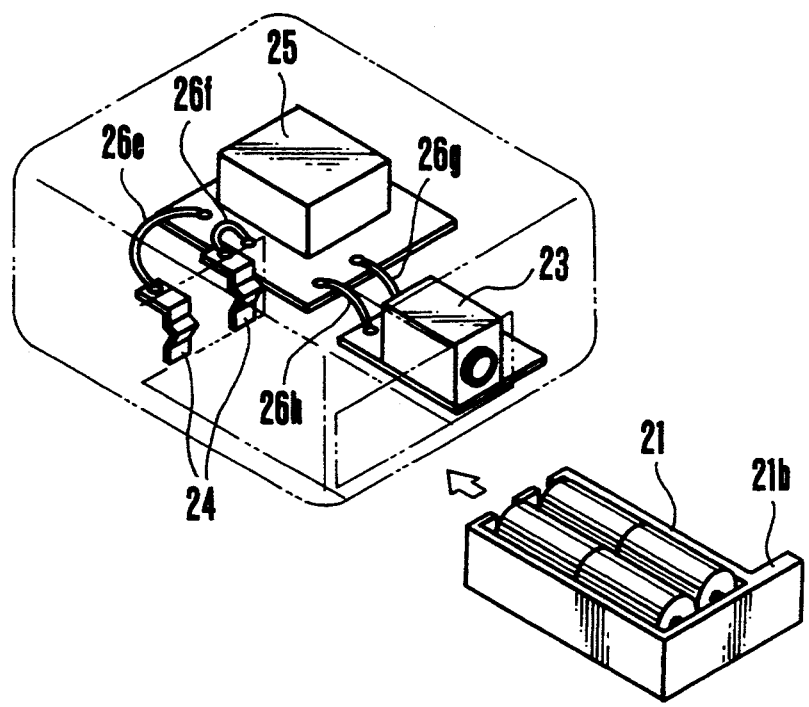
FIG. 21 is an oblique view showing an electric power supply device which is arranged according to this invention as a fifth embodiment thereof in the state where a battery pack is mountable.
Figure 22:
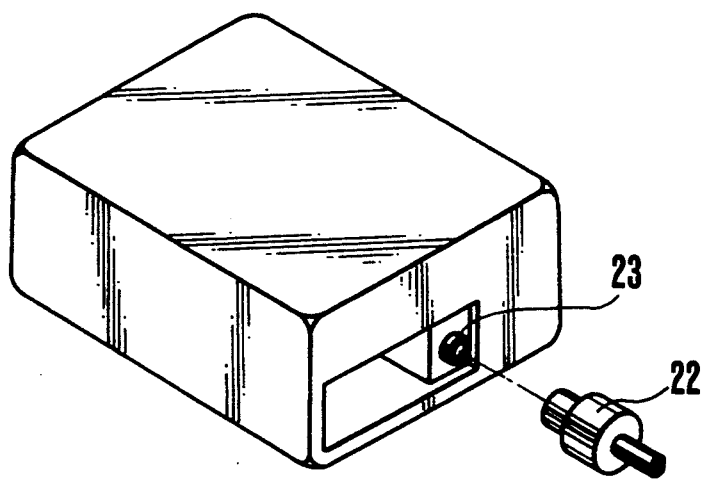
FIG. 22 is an oblique view showing the electric power supply device which is the fifth embodiment of this invention in a state of permitting a power supply plug to be inserted into a power supply jack.
Figure 23:
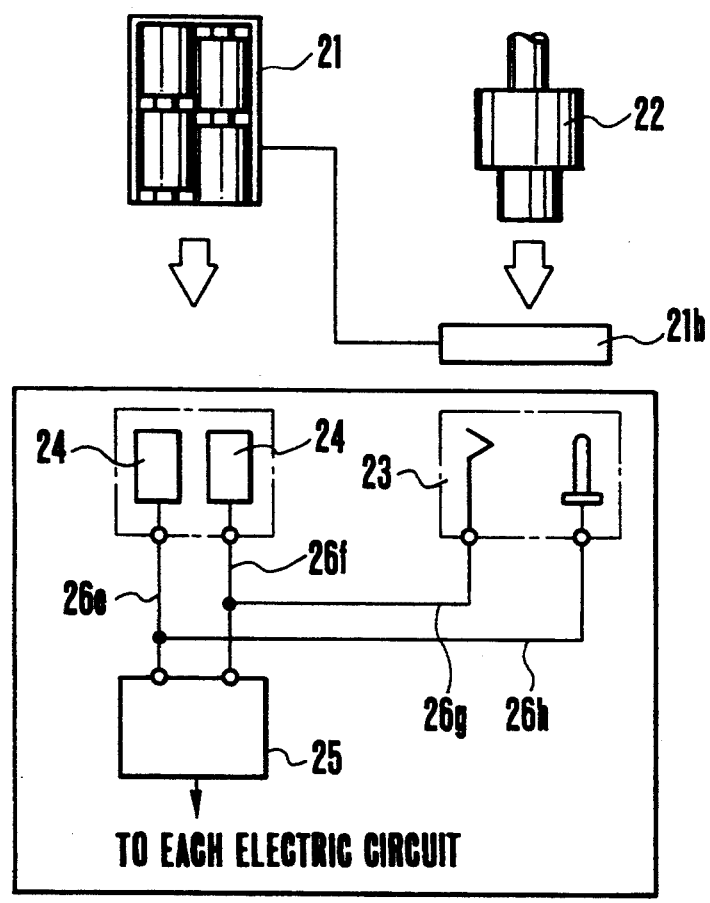
FIG. 23 shows a circuit equivalent to the electric power supply device shown in FIGS. 21 and 22.

FIGS. 21, 22 and 23 show the arrangement of an electric power supply device according to this invention as a fifth embodiment thereof. FIG. 21 is an oblique view showing the electric power supply device in a state of mounting a battery pack. FIG. 22 is an oblique view showing the electric power supply device in a state of inserting a power supply plug into a power supply jack. FIG. 23 shows a circuit equivalent to the electric power supply device shown in FIGS. 21 and 22.

Referring to FIGS. 21 to 23, a battery pack 21 has a tongue part 21b and contains therein dry cells or secondary batteries as a power source. A power supply plug 22 is provided for supplying DC electric power from an AC/DC converter, etc. Reference numeral 23 denotes a power supply jack. Battery pack contacting contacts 24 are arranged to come into contact with the contacts of the battery pack 21. A voltage transforming circuit unit 25 is arranged to voltage-transform the supplied power into power suited for each of applicable electric circuits and to distribute and supply the power to each electric circuit. Numerals 26e to 26h denote lead wires arranged for power transmission.

With the fifth embodiment arranged as shown in FIGS. 21 to 23, when the electric power supply device is in a state of supplying electric power from the battery pack 21 as shown in FIG. 21, the battery pack 21 is mounted. With the battery pack 21 mounted, a hole provided in the power supply jack 23 for inserting the power supply plug 22 is covered by the tongue part 21b of the battery pack 21. The power supply plug 22 then cannot be inserted, so that duplex power feeding can be prevented.

When the electric power supply device is in a state of supplying electric power from the AC/DC converter through the power supply plug 22, as shown in FIG. 22, the power supply plug 22 is inserted into the power supply jack 23. With the power supply jack 23 inserted, the power supply plug 22 interferes with the tongue part 21b of the battery pack 21 in such a way as to hinder the battery pack 21 from being mounted, so that duplex power feeding can be prevented.

Further, in the fifth embodiment as shown in FIGS. 21 to 23, the power transmission path from the battery pack 21 to the voltage transforming circuit unit 25 is arranged to be very short, including only the lead wires 26e and 26f and excluding the contact part of any change-over switch or the like. Therefore, the impedance of the power transmission path can be lowered to lower the possibility of occurrence of a voltage drop in the power supplied from the battery pack 21. This enables the device to sufficiently use up electric power of the battery pack 21 without causing any shut-down of the electronic apparatus halfway in operation.

Figure 24:
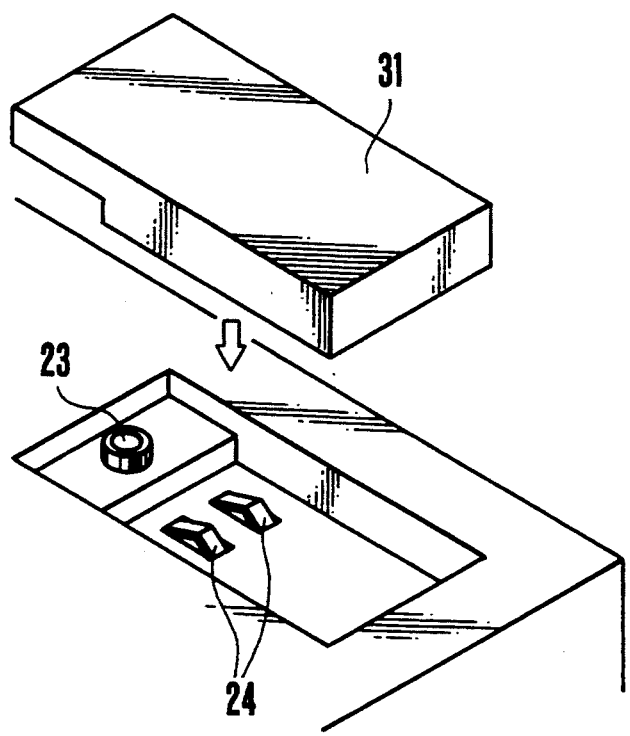
FIG. 24 is an oblique view showing an electric power supply device which is arranged according to this invention as a sixth embodiment thereof in the state where a battery pack is mounted.
Figure 25:
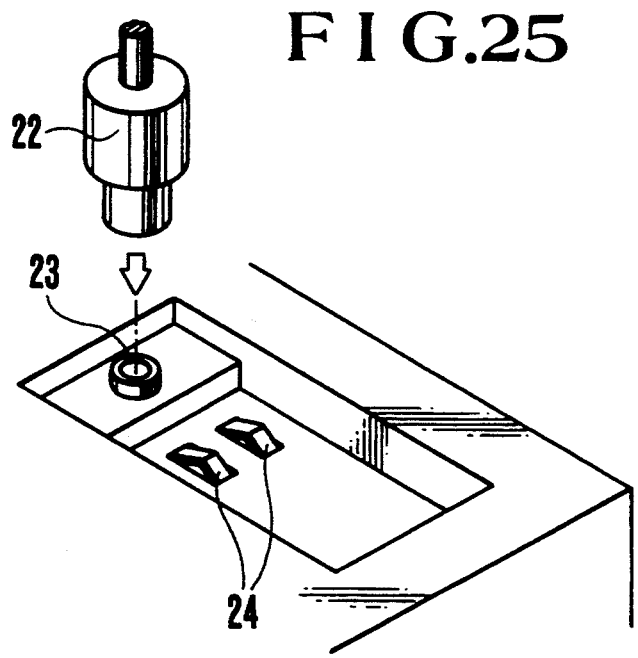
FIG. 25 is an oblique view showing the electric power supply device which is the sixth embodiment of this invention in the state where a power supply plug is inserted into a power supply jack.
Figure 26:
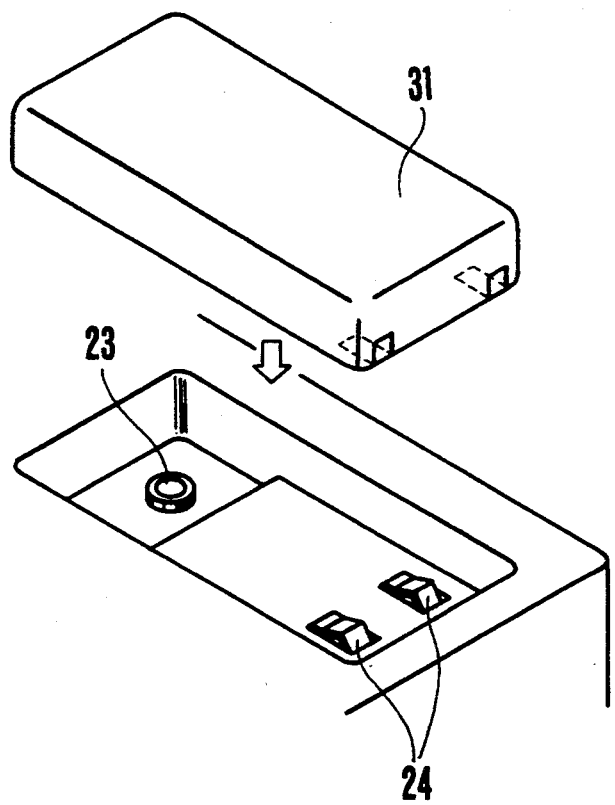
FIG. 26 is an oblique view showing the electric power supply device which is the sixth embodiment of this invention in the state where a battery pack is mounted.
Figure 27:
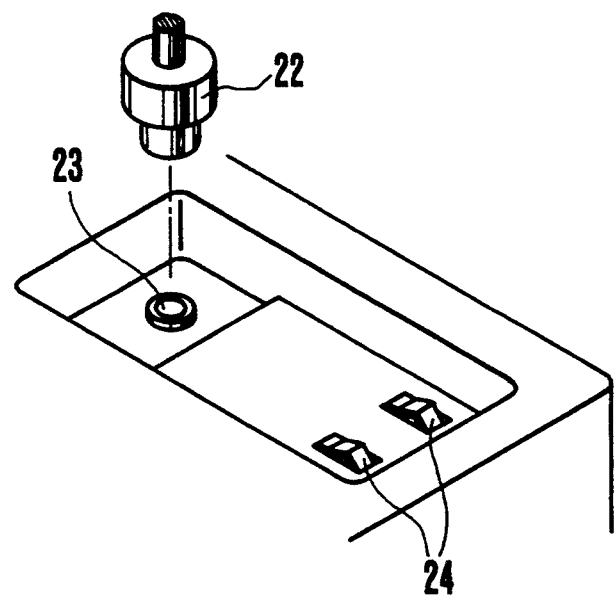
FIG. 27 is an oblique view showing the electric power supply device which is the sixth embodiment of this invention in the state where a power supply plug is inserted into a power supply jack.

FIGS. 24 to 27 show the arrangement of an electric power supply device according to this invention as a sixth embodiment thereof. FIGS. 24 and 26 are oblique views showing the electric power supply device in a state of mounting a battery pack. FIGS. 25 and 27 are oblique views showing the device in a state of inserting a power supply plug into a power supply jack. Further, in FIGS. 24 to 27, parts arranged in the same manner as the corresponding parts of the fifth embodiment are indicated by the same reference numerals, and the details of them are omitted from description.

A battery pack 31 in the sixth embodiment does not have to be provided with a tongue part like the tongue part 21b of the battery pack 21 in the fifth embodiment. In the case of the sixth embodiment, the battery pack 31 is arranged to cover an inserting hole provided in the power supply jack 23 for inserting the power supply plug 22, when the battery pack 31 is mounted as shown in FIGS. 24 and 26. With the battery pack 31 mounted, the power supply plug 22 cannot be inserted into the power supply jack 23. Further, when the device is in a state of supplying electric power from an AC/DC converter, etc., through the power supply plug 22 as shown in FIGS. 25 and 27, the power supply plug 22 is inserted into the power supply jack 23. In this state, the power supply plug 22 interferes with the battery pack 31 in such a way as to hinder the battery pack 31 from being mounted on the device, so that duplex power feeding can be prevented. The arrangement enables the sixth embodiment to have the same advantages as the arrangement of the fifth embodiment described above.

As described above, each of the fifth and sixth embodiments is arranged to be capable of preventing duplex power feeding from a plurality of power sources of different kinds with a very simple and low-cost structural arrangement. In supplying electric power from the battery pack which contains therein dry cells or secondary batteries, the power is supplied through the lead wires which are arranged as the power supply path to be short excluding the contacts of any change-over switch or the like. The short power supply path effectively prevents occurrence of a voltage drop in the power source due to the wiring resistance of the lead wires or the contact resistance of a change-over switch. Therefore, the battery pack can be effectively used without causing any shut-down of the electronic apparatus halfway in operation.

The arrangement of the embodiments of this invention not only prevents duplex power feeding from a plurality of power sources of different kinds and occurrence of a voltage drop, as described above, but also gives an electric power supply device excelling in operability and safety.

What is claimed is:

1. An electric power supply device for supplying electric power to an electronic apparatus, comprising:
   a) a first power source connection terminal arranged to be connected to a first power source;
   b) a second power source connection terminal arranged, separately from said first power source connection terminal, to be connected to a second power source; and
   c) a cover member for selectively covering said first power source connection terminal and said second power source connection terminal, respectively, said cover member being arranged to prevent said second power source from being connected to said second power source connection terminal when said first power source connection terminal is in a state of being connectable to said first power source and to prevent said first power source connection terminal from being connected to said first power source when said second power source connection terminal is in a state of being connectable to said second power source.

2. A device according to claim 1, wherein said first power source includes an external power source device different from said electronic apparatus and said electric power supply device.

3. A device according to claim 1, wherein said second power source includes a battery pack.

4. An electric power supply device for supplying electric power to an electronic apparatus, comprising:
   a) a first power source connection terminal arranged to be connected to a first power source;
   b) a second power source connection terminal arranged to be connected to a second power source; and
   c) a cover member for selectively covering said first power source connection terminal and said second power source connection terminal, respectively, said cover member being arranged to cover said second power source connection terminal in association with the connecting operation of said first power source connection terminal and said first power source, thereby causing said second power source connection terminal to be in an unconnectable state with said second power source and to cover said first power source connection terminal in association with the connecting operation of said second power source connection terminal and said second power source, thereby causing said first power source connection terminal to be in an unconnectable state with said first power source.

5. A device according to claim 4, wherein said first power source includes an external power source device different from said electronic apparatus and said electric power supply device.

6. A device according to claim 4, wherein said second power source includes a battery pack which contains a battery therein.

7. An electric power supply device for supplying electric power to an electronic apparatus, comprising:
   a) a connection terminal for receiving electric power from a power line; and
   b) a battery pack containing a battery therein, said battery pack being provided with a member arranged to cover at least a part of said connection terminal when said battery pack is mounted on the device and to expose said connection terminal when said battery pack is demounted from the device.

8. An electric power supply device for supplying electric power to an electronic apparatus, comprising:
   a) a battery pack containing a battery therein; and
   b) a connection terminal for receiving electric power from a power line, said connection terminal being arranged in a position to be covered by part of a casing of said battery pack when said battery pack is mounted on the device and to be exposed when said battery pack is demounted from the device.

* * * * *